Figure 3:
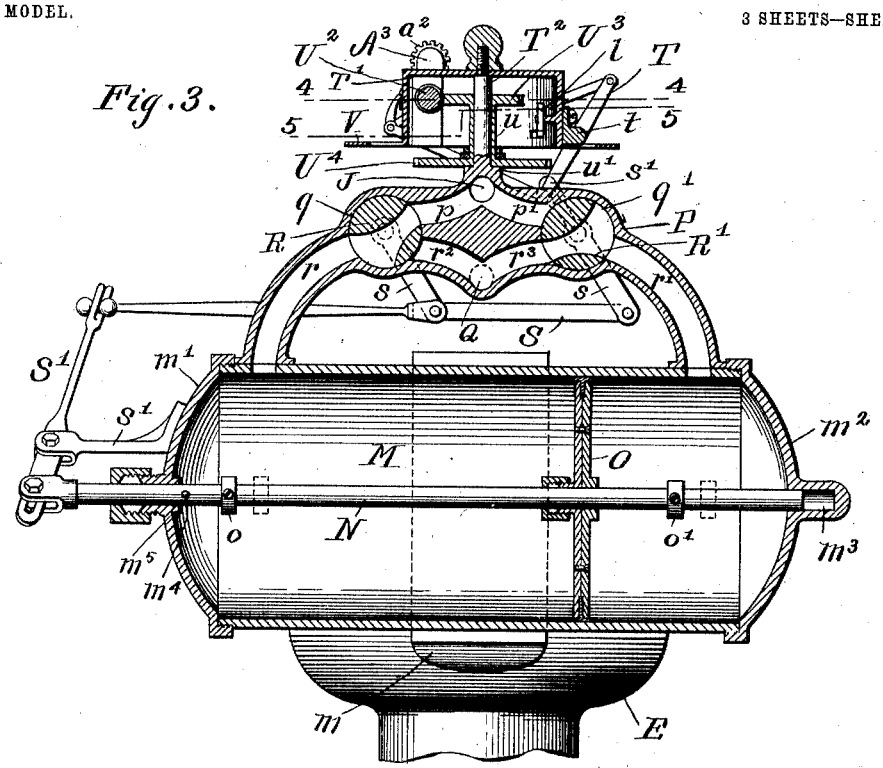

No. 759,209. PATENTED MAY 3, 1904.
J. B. BEAM.
LIQUID MEASURING APPARATUS.
APPLICATION FILED SEPT. 11, 1903.
NO MODEL. 3 SHEETS—SHEET 1.
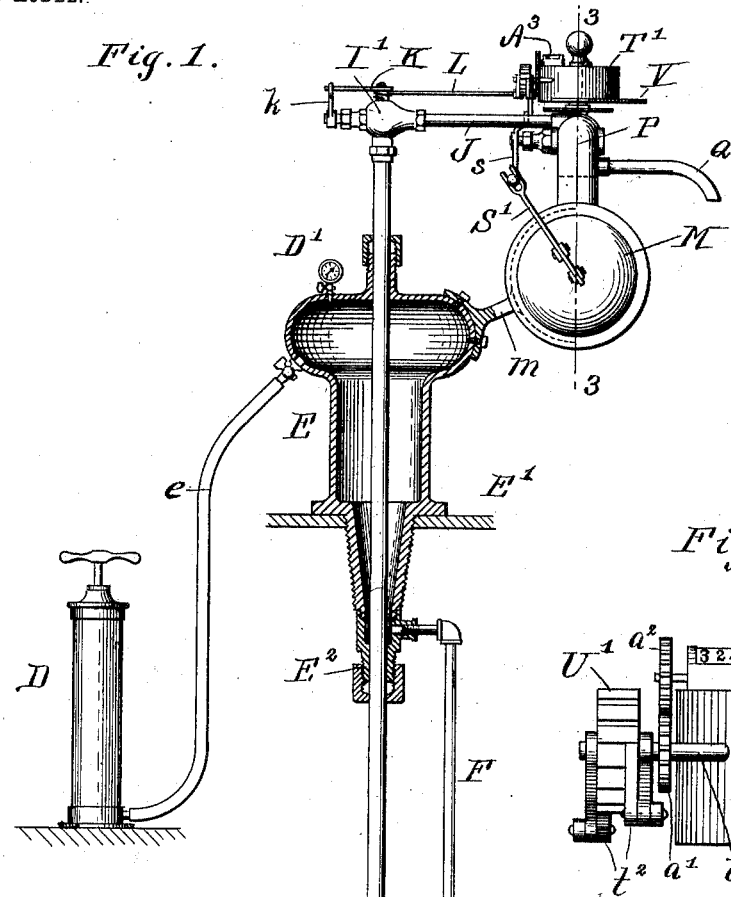
Fig. 1.
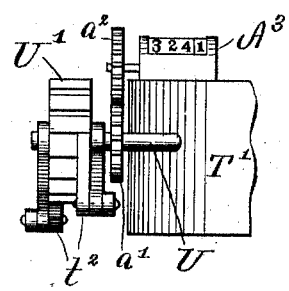
Fig. 2.
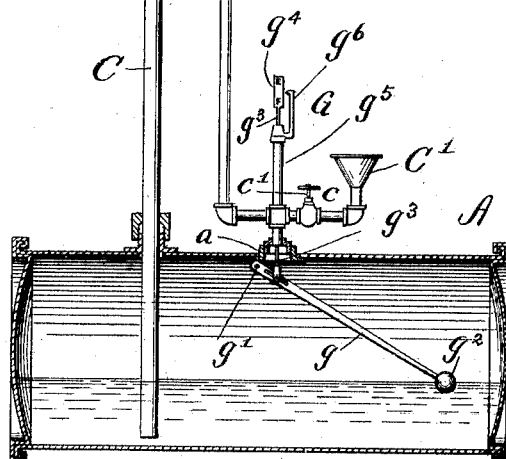
WITNESSES:
Ernest Pulsford.
[signature]
INVENTOR:
J. B. Beam
BY HIS ATTORNEYS,
Baldwin Davidson & Wight No. 759,209. PATENTED MAY 3, 1904.
J. B. BEAM.
LIQUID MEASURING APPARATUS.
APPLICATION FILED SEPT. 11, 1903.
NO MODEL. 3 SHEETS—SHEET 2.

WITNESSES:
Ernest Pulsford.

INVENTOR:
J. B. Beam.
BY HIS ATTORNEYS,
Baldwin Davidson Wight.

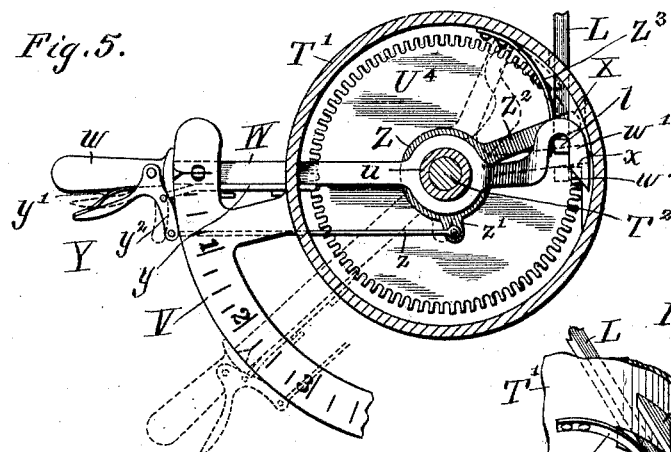
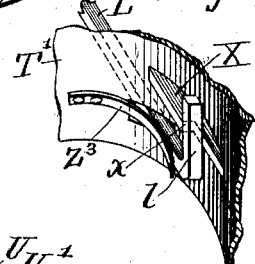
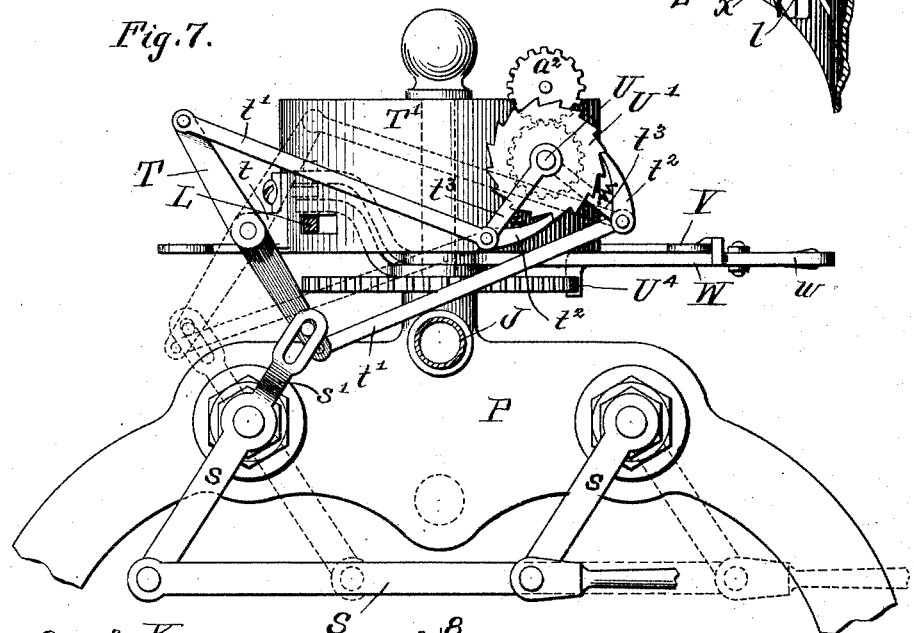
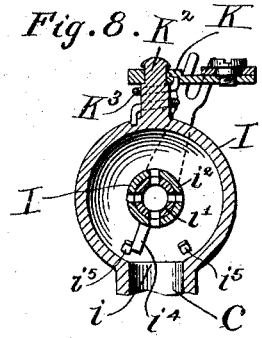
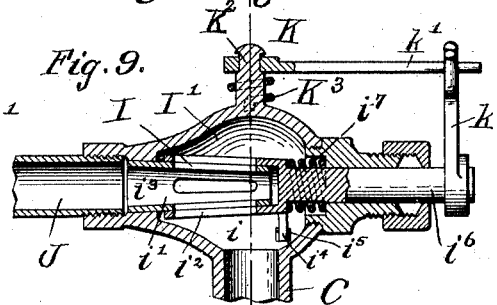

No. 759,209.

Patented May 3, 1904.

UNITED STATES PATENT OFFICE.

JACOB B. BEAM, OF BIGRUN, PENNSYLVANIA, ASSIGNOR OF ONE-HALF TO JOHN M. McCLURE, OF BIGRUN, PENNSYLVANIA.

LIQUID-MEASURING APPARATUS.

SPECIFICATION forming part of Letters Patent No. 759,209, dated May 3, 1904.

Application filed September 11, 1903. Serial No. 172,764. (No model.)

*To all whom it may concern:*

Be it known that I, JACOB B. BEAM, a citizen of the United States, residing at Bigrun, in the county of Jefferson and State of Pennsylvania, have invented certain new and useful Improvements in Liquid-Measuring Apparatus, of which the following is a specification.

My invention relates to apparatus for measuring and dispensing liquids, and particularly to that class of such apparatus in which the liquid is drawn or forced from a supply tank or reservoir to a chamber in which a definite quantity is measured just before its delivery. Such apparatus has heretofore been so constructed that valve mechanism operated by hand so controls the flow of liquid from the measuring-chamber that by merely shifting the valves after each measured quantity has been delivered any number of such measured quantities may be obtained in quick succession. It has also been proposed to automatically shift such valves in such manner that a succession of measured quantities may be obtained; but such latter mechanism is not adapted to automatically stop the delivery of the liquid when the desired amount is discharged, it being necessary for an attendant to count the measured quantities and stop the flow of liquid from the supply-reservoir when the requisite quantity has been dispensed.

The object of my invention is to so improve such mechanism that by merely once setting it any desired number of measured quantities of liquid may be obtained. The arrangement is such that after the requisite amount has been delivered the flow of liquid to the measuring apparatus is automatically cut off.

In carrying out my invention I store the liquid in a tank, barrel, or other reservoir and cause the liquid to flow therefrom under pressure to a chamber within which is arranged a piston that is adapted to reciprocate a definite distance, which is regulated by adjustable stops placed on a rod on opposite sides of the piston. The rod is connected by lever mechanism with two valves which control the flow of liquid to and from the opposite ends of the measuring-chamber. These valves are so operated that when liquid is being delivered under pressure to the measuring-chamber on one side of the piston it is being discharged by the piston from the opposite end of such chamber, and the organization is such that the amount of liquid delivered at each stroke of the piston is equal to the amount of liquid contained in the space traversed by the piston at each stroke, the area of such space being determined by the positions of the stops on the valve-operating rod. The supply-pipe which connects the measuring-chamber with the liquid-reservoir is provided with an inlet-valve which is normally held closed; but by means of hand-operative devices this valve may be opened. These devices are so constructed that they may be set to hold the inlet-valve open until any desired amount of liquid has been measured and delivered. This mechanism will be hereinafter fully decsribed; but in general it consists of devices which hold a hand-lever at different definite distances from a zero-point. As soon as the hand-lever is moved from the zero-mark one or more steps the inlet-valve to the measuring-chamber is fully opened. The liquid being under pressure, the measuring mechanism is at once set into operation. Each time that the valves of the measuring-chamber are shifted at the end of each stroke of the piston mechanism is brought into operation which causes the hand-lever to be set back one step. This operation is continued until the hand-lever is returned to zero, at which time the inlet-valve is automatically closed and the delivery of liquid from the measuring-chamber is discontinued. It will be readily understood that the number of measured quantities dispensed will correspond with the number of points traversed by the hand-lever when first set.

In connection with the measuring mechanism I also employ registering or recording mechanism which is automatically operated and which indicates the total amount of liquid measured and delivered.

Figure 4:
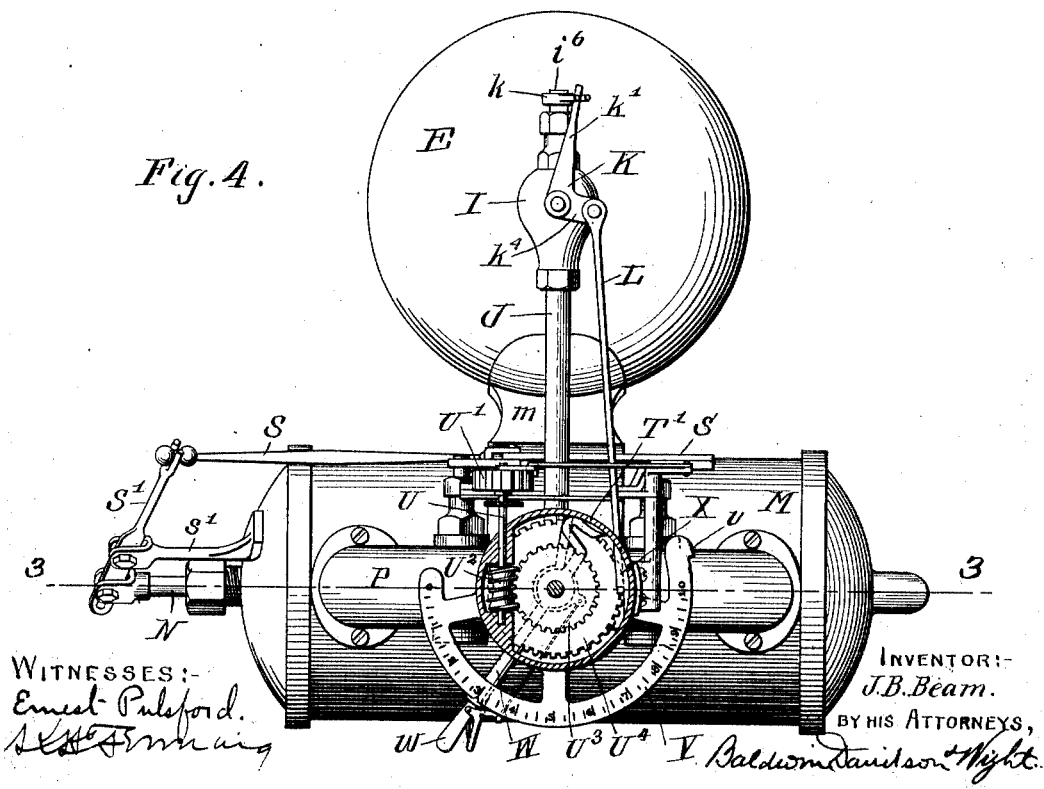

In the drawings, Figure 1 shows a vertical section through apparatus embodying my improvements. The remaining views are on an enlarged scale. Fig. 2 is a detail view of the pawl-and-ratchet mechanism for operating the recording devices and for setting back the hand-lever. Fig. 3 shows a vertical central section through the measuring-chamber and certain parts connected therewith on the line 3 3 of Fig. 4. Fig. 4 shows a horizontal section on the line 4 4 of Fig. 3 looking downward. Figs. 5 to 9, inclusive, are on a somewhat larger scale than Figs. 3 and 4. Fig. 5 shows a horizontal section on the line 5 5 of Fig. 3 looking downward. Fig. 6 is a detail view showing the manner in which the inlet-valve is held open during the measuring operation. Fig. 7 shows a side elevation of that part of the apparatus above the measuring-chamber. Fig. 8 shows a transverse section of the inlet-valve on the line 8 8 of Fig. 9. Fig. 9 shows a vertical longitudinal section of the inlet-valve.

The liquid to be measured may be contained in a barrel, tank, or other suitable reservoir and may be located in a cellar below the measuring apparatus, in a room above it, or in any other suitable place. In the drawings I have shown a tank located below the measuring apparatus. When such is the case, it is necessary to employ some means for supplying air under pressure to force the liquid upward, and it is essential that the liquid shall in any event be supplied under considerable pressure. Of course if the tank is located above the level of the measuring-chamber gravity alone may be depended upon for affording the requisite pressure.

In the particular apparatus illustrated the tank A is shown as being made of metal closed air-tight and having a discharge-pipe C extending from near the bottom of the tank up to the measuring apparatus. An air-pump D is connected with an air-chamber E by pipe $e$, and this chamber is connected by a pipe F with an opening $a$ in the top of the tank. The pipe F need have no valve; but in order to indicate the level of the liquid within the tank I employ a level-indicator G of well-known construction, consisting of a lever $g$, pivoted at one end $g'$ to the top of the tank and carrying a float-ball $g^2$ on its opposite end. The lever is connected with a vertical rod $g^3$, on the upper end of which is a plate $g^4$, containing the letters "F" and "E," (standing for "Full" and "Empty.") The rod passes through a pipe $g^5$, and on the upper end of this pipe is a stationary pointer $g^6$. The operation of these devices will be readily understood without further explanation. The tank may be filled by means of a funnel C', which is connected with the pipe F by a branch $c$, in which is a valve $c'$, that should be closed as soon as the supply of liquid to the tank is stopped. The air-chamber has an enlarged upper end carrying a pressure-gage D'. The lower part of the casing of the air-chamber is tapered and screw-threaded, adapting it to be secured to a support E' or to a barrel or directly to a tank or other receptacle. The pipe F is connected to the lower end of the tapered chamber by couplings $E^2$. By removing the couplings the pipe F may be disconnected and the air-chamber may be connected directly with the reservoir.

The pipe C is provided at its upper end with a valve I, which is held normally closed, but held open for the required time when liquid is being measured. This valve is located within a chamber I', which connects with the pipe C by a port $i$. As shown, the valve comprises two members $i'$ $i^2$, the inner member $i'$ being hollow and frustum-shaped and rigidly secured to the casing at the outlet-port $i^3$, which connects with the measuring apparatus by a pipe J. The outer valve member $i^2$ is also hollow and frustum-shaped, and it fits over the inner member $i'$. It is adapted to turn about the axis of the inner valve member to a limited extent, its movement being controlled by the arm $i^4$, which plays between lugs $i^5$, projecting from the casing. Both valve members are slotted, and these slots are so related that when those in the outer valve member register with those in the inner member the valve will be opened and liquid may flow from the pipe C through the valve and out into the pipe J. The outer valve member is formed with a stem $i^6$ and is held in engagement with the inner member by a spring $i^7$, surrounding the stem. This arrangement insures a perfect fit even after considerable wear. The outer end of the valve-stem carries an arm $k$, which is forked at its upper end, where it engages the longer arm $k'$ of a bell-crank lever K, which is pivoted on a boss $K^2$, projecting upward from the valve-chamber. A spring $K^3$ normally holds the valve closed. The mechanism, as shown, is such that an eighth-turn given to the valve in one direction will open it to its full extent, while a corresponding movement in the opposite direction will close it. If desired, a greater number of slots or openings may be formed in the valve members, requiring less movement for opening and closing the valve. The shorter arm $k^4$ of the bell-crank lever K is jointed to a rod L, which extends to the measuring mechanism. Before explaining how this rod is operated to open and close the inlet I will describe other parts of the mechanism. As shown in Fig. 3, I employ a measuring vessel M, which is preferably supported on a bracket $m$, projecting from the air-chamber E. This vessel, as shown, is cylindrical, with its larger axis horizontal, and its ends or heads $m'$ $m^2$ are slightly dished. A rod N extends through the head $m'$ and into a recess $m^3$ in the head $m^2$. The rod is adapted to slide back and forth to a limited extent. When sliding in one direction, it is limited by the end of the recess $m^3$, and when sliding in the opposite direction it is limited by the pin $m^4$, which strikes against the boss $m^5$.

Within the measuring-chamber is a piston O, which is adapted to slide on the rod N and closely fits the walls of the chamber M, so that no liquid can pass by it. The movement of the piston is limited by stops $o$ $o'$ on the rod O on opposite sides of the piston. These stops are made adjustable for a purpose hereinafter explained.

The supply-pipe J, leading from the valve I, connects with two passages $p$ $p'$ in a casing P, attached to the measuring vessel. These passages lead to valve-chambers $q$ $q'$, and from these valve-chambers passages $r$ $r'$ lead to opposite ends of the measuring-chamber. Passages $r^2$ $r^3$ also lead from the valve-chambers to the outlet pipe or spout Q. Each valve-chamber contains a cylindrical valve R R', each having a transverse opening through which the liquid may pass. Both valves have their stems secured to levers $s$, which are jointed to the rod S, in turn jointed to a lever S', pivoted to a bracket $s'$, and jointed to the outer end of the rod N.

The mechanism thus far described operates as follows: If liquid under pressure is delivered continuously through the inlet-pipe J, the chamber M on both sides of the piston N and all the passages between the chamber and the inlet-pipe after a few strikes of the piston will soon become filled with liquid. Then assuming the piston to be at the left-hand end of the measuring-chamber as viewed in Fig. 3, liquid will pass through the valve R and into the left-hand end of the cylinder M. The liquid-pressure will cause the piston to move to the right, and as the valve R' is open to the exit Q liquid on the right-hand side of the piston will be discharged through such exit, the quantity of liquid discharged being equal to the amount contained in that part of the measuring-chamber transversed by the piston. As the piston approaches the right-hand end of the chamber M it abuts against the stop $o'$ and thereafter carries the rod N to the right until it is stopped by the end of the recess $m^3$. This movement of the rod N causes the valves R R' to be reversed and liquid will then be admitted to the right-hand end of the measuring-chamber and discharged from the opposite end thereof. These operations may be repeated indefinitely until the supply of liquid is exhausted or until the inlet-valve is closed either by hand or by the automatic mechanism hereinafter described.

The measuring-chamber should be formed to contain or measure a definite quantity of liquid—such, for instance, as a pint or quart. In the present case I have assumed that it is adapted to measure a quart; but by adjusting the stops $o$ $o'$ it may be adapted to measure more or less than a quart, the quantity measured being always determined by the space traversed by the piston at each stroke.

From one of the levers $s$ projects upwardly an arm $s'$, which is jointed to a lever T, pivoted between its ends to a bracket $t$, attached to a cap T', which is supported on a standard T², rising from the valve-casing P. To each end of the lever T is jointed a pawl-operating rod $t'$, the opposite end of which carries a spring-pawl $t^2$ and which is also connected with a rod $t^3$, depending from a shaft U, which extends into the cap T' and has bearings therein, as illustrated in Fig. 4. On the outer end of the shaft U is secured a ratchet-wheel U', with which the pawls engage. This wheel, as shown, is provided with sixteen teeth, and each forward movement of either pawl advances the ratchet-wheel the space of four teeth. This precise arrangement, however, is not essential. The shaft U carries a worm U², (see Fig. 4,) which engages a worm-wheel U³ on a sleeve $u$, surrounding the standard T², and on the lower end of which is formed a toothed wheel U⁴, which rests on a shoulder $u'$ of the standard. The wheel U⁴, sleeve $u$, and worm-wheel U³ are free to be turned about the standard by the worm U².

Partially surrounding the lower end of the cap T' is a graduated semicircular plate V. On its upper face this plate is graduated in the manner indicated in Fig. 4, and for present purposes it may be assumed that the unit of measure is one quart and that each of the numbered marks on the scale indicates one or more gallons. In Fig. 4 the scale is marked from zero to ten gallons. Of course the plate V need not be a complete semicircle, but may be of any desired length.

Pivoted to the standard T² is a lever W, which projects out from beneath the cap T' beyond the plate V and is formed at its outer end with a handle $w$. The inner end of this lever is formed with a hook $w'$, having a beveled end $w^2$, which when the lever W is at zero covers the shoulder $x$ on a bracket X, projecting from the inside of the cap T'. An upwardly-projecting arm $l$ on the end of the rod L is adapted to engage this shoulder, and when it does so engage the shoulder the inlet-valve is held open. To the handle $w$ is pivoted a detent-handle Y, carrying a sliding detent-rod $y$, adapted to engage the teeth of the wheel U⁴. A spring $y'$ tends to hold the rod $y$ in such engagement. The detent-handle is formed with an arm $y^2$, to which is jointed a rod Z, the inner end of which is jointed to an arm $z'$, projecting from an annular plate, surrounding the standard T², below the lever W, and free to turn thereon. This plate is formed with an arm Z², which is adapted to cross the rod L just behind its arm $l$. A leaf-spring Z³, attached to the inside of the cap T', bears on the inner end of the rod L and tends to force the arm $l$ into engagement with the shoulder $x$.

The mechanism thus constructed operates in the manner next described. In Fig. 5 the hand-lever W is shown at zero. The arm $l$ is out of engagement with the shoulder $x$ and the inlet-valve I is closed. If now the handle be grasped, the detent-rod will be disengaged from the wheel $U^4$, and the arm $Z^2$ will move the rod L forward until its arm $l$ comes opposite the shoulder $x$; but the arm is prevented from being forced by the spring $Z^3$ into engagement with the shoulder $x$ by the beveled end $w^2$ of the hook $w'$. As soon, however, as the lever W is turned to the right the end of the hook recedes from the shoulder and allows the arm $l$ to engage the shoulder, and thus hold the inlet-valve I open. It is true that a movement of the lever W to the right will also cause the arm $Z^2$ to be moved, and there might be a tendency for the arm $Z^2$ to release the rod L before the hook $w'$ had moved away from the shoulder $x$; but I so adjust the mechanism that when the handle $w$ is first grasped the detent-handle is only partially moved—for instance, to the position indicated by dotted lines in Fig. 5—and then after the operator commences to move the lever W a further grasp is given to the handle, which causes the arm $Z^2$ to be held for an instant until the hook $w^2$ has receded from the shoulder. As long as the inlet-valve is held open the liquid in measured quantities will be delivered through the spout Q. The number of these measured quantities is determined by the position of the detent $y$ on the plate V. Each tooth in the wheel $U^4$ corresponds with a unit of measure on the scale. If the detent is advanced the space of one tooth, one unit of measure will be delivered—say one quart. If the detent be advanced eight teeth, eight quarts, or two gallons, will be delivered. This is effected as follows: As before stated, when the lever W is turned to the right to any extent the inlet-valve is fully opened and liquid is delivered in measured quantities at each movement of the piston from opposite ends of the measuring-chamber. Each time that a measured quantity is delivered the valves R R' are shifted, and at this time the pawl-and-ratchet mechanism is actuated to turn the worm $U^2$, which causes the wheel $U^3$, and consequently the wheel $U^4$, to be moved in a direction opposite to that taken by the lever W when it was being set. Each action of the worm causes the wheel $U^4$ to be moved a space of one tooth, and after it has been moved through a space corresponding to the distance of the detent from zero the detent will arrive at the zero-point, and the beveled end of the hook $w'$ will force the arm $l$ out of engagement with the shoulder $x$, and then the spring $k^4$ will cause the rod L to be returned and the inlet-valve I to be closed. In this manner the flow of liquid is automatically stopped as soon as the predetermined quantity has been dispensed. If it be desired to empty the supply-reservoir, it may be done by turning the lever W around to the extreme end of the plate V, on which there is a shoulder $v$, that engages the outer end of the arm $y^2$ of the detent-handle and forces it outward, so that the detent is disengaged from the wheel $U^4$, and therefore the lever W is not set back, as in the usual operation of the mechanism, but remains stationary and out of engagement with the rod L.

In order to register or record the total amount of liquid measured, I employ counting mechanism $A^3$ of any suitable kind, which may be geared to the worm-shaft U by spur-wheels $a'$ $a^2$.

The mechanism which I have described is especially intended for dispensing oil in measured quantities; but it may be used to equal advantage for measuring and dispensing other liquids.

I have shown and described the best way now known to me of carrying out my invention, but wish it understood that the mechanism can be considerably varied without departing from the novel features of my invention.

I claim as my invention—

1. An apparatus for measuring and dispensing liquids, comprising a measuring-chamber, a piston reciprocating therein, a reservoir for supplying fluid under pressure to the measuring-chamber, valve mechanism operated by the piston for controlling the flow of liquid to and from opposite ends of the measuring-chamber, an inlet-valve between said controlling-valves and the fluid-supply, a rod attached to said inlet-valve, a locking device engaging said rod for holding the inlet-valve open during the operation of the measuring mechanism, means for causing the rod to engage the locking device and for simultaneously setting the mechanism to deliver any desired number of measured quantities, and devices operated by the measuring mechanism for automatically releasing said rod from said locking device and allowing the inlet-valve to close after the predetermined number of measured quantities have been delivered.

2. An apparatus for measuring and dispensing liquids comprising measuring mechanism operated by fluid under pressure, an inlet-valve controlling the flow of liquid to the measuring mechanism, a rod for operating said inlet-valve, a device for locking the rod to hold the inlet-valve open, a hand-lever normally holding the valve-rod out of engagement with said locking device and devices for moving the rod into engagement with said locking device when the hand-lever is moved out of the way.

3. An apparatus for measuring and dispensing liquids, comprising measuring mechanism operated by fluid under pressure, an inlet-valve controlling the flow of liquid to the measuring mechanism, a rod for operating said inlet-valve, a device for locking the rod to hold the inlet-valve open, a hand-lever normally holding the valve-rod out of engagement with said locking device, detent mechanism connected with the hand-lever, and a plate carrying an arm adapted to engage the valve-operating rod and move it into engagement with the locking device when the hand-lever is moved from the zero position.

4. An apparatus for measuring and dispensing liquids, comprising measuring mechanism operated by fluid under pressure, an inlet-valve controlling the flow of liquid to the measuring mechanism, a rod for operating said inlet-valve, a device for locking the rod to hold the inlet-valve open, a hand-lever normally holding the valve-rod out of engagement with said locking device, a detent-lever carried by said hand-lever, a detent-rod connected therewith, a plate carrying an arm adapted to engage the valve-operating rod and move it into engagement with the locking device when the hand-lever is moved from the zero position, connections between said plate and the detent-lever and a toothed wheel with which the detent-rod engages.

5. An apparatus for measuring and dispensing liquids, comprising measuring mechanism operated by fluid under pressure, an inlet-valve controlling the flow of liquid to the measuring mechanism, a rod for operating said inlet-valve, a device for locking the rod to hold the inlet-valve open, a toothed wheel moved one step at each operation of the measuring mechanism, a hand-lever normally holding the valve-rod out of engagement with said locking device, detent mechanism connected with the handle and adapted to engage the toothed wheel, a plate carrying an arm adapted to engage the valve-operating rod and move it into engagement with said locking device when the hand-lever is moved from the zero position, and connections between said plate and the detent mechanism.

6. An apparatus for measuring and dispensing liquids, comprising measuring mechanism operated by fluid under pressure, an inlet-valve controlling the flow of liquid to the measuring mechanism, a rod for operating said inlet-valve, a device for locking the rod to hold the valve open, means for causing the rod to engage the locking device and for simultaneously setting the mechanism to deliver any desired number of measured quantities, devices operated by the measuring mechanism for automatically releasing the valve-controlling rod from said locking device and allowing the inlet-valve to close after the predetermined number of measured quantities have been delivered, and a register also actuated by said releasing mechanism.

7. An apparatus for measuring and dispensing liquids comprising measuring mechanism operated by fluid under pressure, an inlet-valve controlling the flow of liquid to the measuring mechanism, a rod for operating said inlet-valve, a device for locking the rod to hold the valve open, a toothed wheel, a worm-wheel connected therewith, a worm engaging said worm-wheel, pawl-and-ratchet mechanism for operating said worm, connections between said pawl-and-ratchet mechanism and the measuring mechanism, a hand-lever normally holding the valve-rod out of engagement with its locking device, a detent-lever carried by said hand-lever and adapted to engage said toothed wheel, and a plate carrying an arm adapted to engage the valve-operating rod and move it into engagement with its locking device when the hand-lever is moved from the zero position.

8. An apparatus for measuring and dispensing liquids comprising measuring mechanism operated by liquid under pressure, an inlet-valve controlling the flow of liquid to said measuring mechanism, hand-operated devices for holding the inlet-valve open, means for locking said hand-operated devices at different positions from zero and means operated by the measuring mechanism for returning said hand-operated devices to the zero position after a predetermined quantity of liquid has been dispensed.

In testimony whereof I have hereunto subscribed my name.

JACOB B. BEAM.

Witnesses:
 HENRY J. BEAM,
 HENRY I. WILSON.